July 5, 1966  C. BRICOUT  3,259,116
INTERNAL COMBUSTION ENGINES
Original Filed May 22, 1963
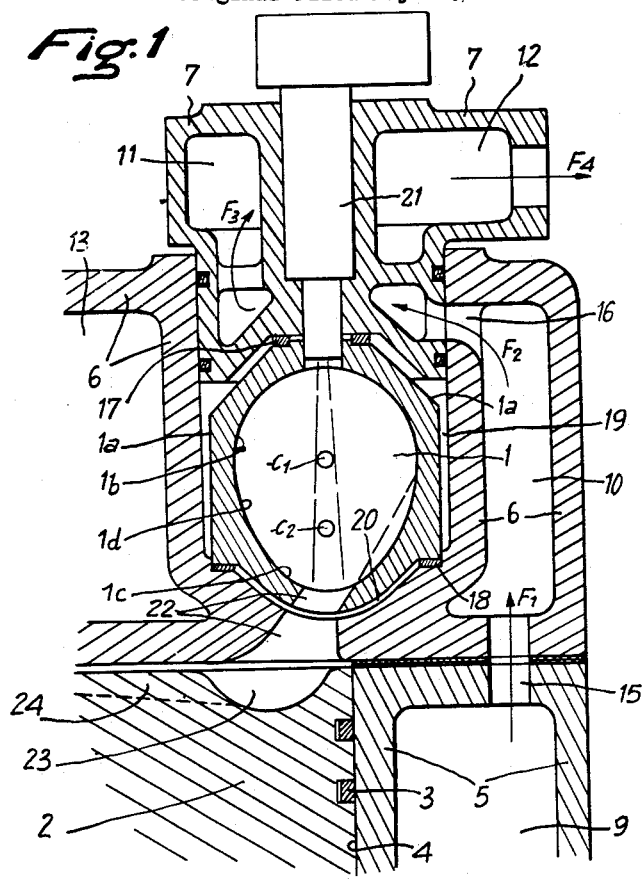
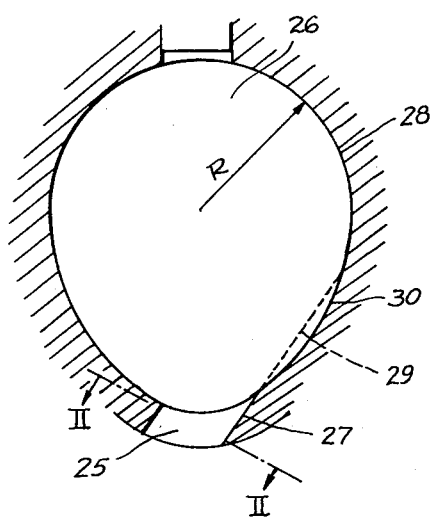
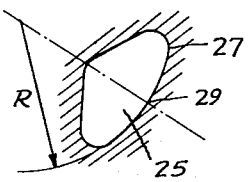
INVENTOR
CONSTANT BRICOUT
BY
ATTORNEY

United States Patent Office 3,259,116
Patented July 5, 1966

3,259,116
INTERNAL COMBUSTION ENGINES
Constant Bricout, Paris, France, assignor to Les Applications Techniques Industrielles L.A.T.I., Paris, France, a civil company of France
Continuation of application Ser. No. 282,368, May 22, 1963. This application Oct. 22, 1965, Ser. No. 500,841
Claims priority, application France, May 28, 1962, 899,009
2 Claims. (Cl. 123—32)

This is a continuation of application Serial No. 282,368, filed May 22, 1963, entitled "Internal Combustion Engines."

The present invention has for its object improvements increasing the total thermal yield of internal combustion engines of the type in which the liquid fuel injected under pressure enters a combustion chamber inside which it begins burning generally under the action of the mere increase in temperature produced by the compression of the air used for combustion, following which it reaches after a combustion as complete as possible the actual cylinder communicating with said combustion chamber through a transfer port and inside which the combustion is brought to completion.

For this purpose, each combustion chamber of the improved engine is thermally insulated with reference to the adjacent sections of the engine.

Such an arrangement allows a more uniform distribution throughout the cycle of a fraction of the heat produced by the preceding combustion and which is stored in the wall of the chamber, whereby the temperature prevailing in the latter at the end of the compression assumes a value larger than that obtained in conventional engines, and this allows in its turn reducing the volumetric rate of compression for a predetermined temperature at the beginning of the injection. This reduction in the compression rate leads to a corresponding decrease of the reverse work of the cycle, that is an increase in the efficiency of the engine.

The invention will be better understood from the ensuing specification taken in conjunction with the drawing wherein:

FIG. 1 is a partial sectional view of an engine cylinder associated with a combustion chamber in accordance with the invention;

FIG. 2 is a sectional detail view of an oval-shaped combustion chamber; and

FIG. 3 is a cross-section through line II—II of FIG. 2.

Turning to FIG. 1, 1 designates the combusiton chamber of one of the cylinders of an engine of the deisel type, wherein the piston 2 is shown at its upper idle point corresponding to the end of the compression stroke. The piston carries the piston rings 3 cooperating with the wall 4 of the cylinder which is formed by a bore in the block 5, which latter carries the cylinder head 6 capped in its turn by the block 7 carrying the injecting means including the injector 21 opening into the upper part of the combustion chamber 1.

The cylinder block 5, the cylinder head 6 and the injector block 7 are provided with recesses or chambers 9, 10 and 11, 12, 13 communicating in a conventional manner through the ports 15 and 16 and forming the cooling circuit illustrated symbolically by the arrows F1, F2, F3, F4.

The outer wall 1a of the combustion chamber is spaced from the walls of the cylinder head by the gaskets 17 and 18 which define, on the one hand, a sealed volume 19 and, on the other hand, an open space 20. The volume 19 is held under partial vacuum through the agency of a valve which is not illustrated.

The combustion chamber 1 is made of a refractory material such, for instance, as refractory steel or cast iron, or else, of an alloy steel coated with ceramic material, said chamber having a substantially egg-shape defined by a spherical cap 1b at its upper end and by a spherical cap 1c at its lower end, said two caps being interconnected by a tore-shaped surface of revolution 1d merging into said caps and the generating line of which is curvilinear. It is seen that the radius of curvature of the upper cap 1b is larger than that of lower cap 1c.

The apex of the cap 1b is provided with an opening registering with the injector 21 extending axially of the chamber, while the apex of the lower cap 1c is provided with the transfer port 22 which extends through the adjacent wall of the cylinder head so as to open obliquely and flaringly into the actual cylinder. The end of the injector 21 is in a slightly receding position with reference to the inner wall of the combustion chamber so as to further its cooling by the liquid circuit provided inside the block 7.

In registry with the transfer port 22, the piston 22 is provided with a transfer recess 23 connected through a channel 24 with an auxiliary recess which is not illustrated.

When the engine is operative, the heat produced by the combustion of the amount of fuel introduced into the chamber 1 through the injector, at the beginning of each driving stroke and stored inside the wall of the combustion chamber, cannot be removed except very slowly since said chamber is heat insulated with reference to the cylinder head 6 and to the injector block 7. Said heat keeps therefor the wall of the combustion chamber at a temperature which is substantially higher than that which would prevail under the same conditions inside a chamber which is not thermically insulated. This results in a corresponding increase in the temperature of the combustion air which allows reducing the volumetric compression ratio for a same temperature at the beginning of the injection.

Obviously, the reduction of the ratio of compression required for obtaining a predetermined temperature in the combustion chamber leads to a substantial improvement, since it leads to a corresponding reduction of the reverse work required from the engine.

Furthermore, each of the spherical caps 1b, 1c brought, together with the entire inner wall of the chamber 1, to a very high temperature, produces at the center of the caps at points C1 and C2 an actual focalization of the heat, which leads correspondingly to the formation, in the immediate vicinity of said two centers, of two sources of heat which further the combustion of the fuel injected by producing a sort of cracking as generally resorted to in the distillation of petroleum oils.

This latter result leads to a reduction in the delay required for the ignition of the injected fuel and to a greater uniformity in combustion, while the adjustment of the beginning of the injection allows obtaining a cycle including a shorter period corresponding to combustion under constant volume conditions and a longer period corresponding to combustion under constant pressure conditions.

The reduced speed of increase of the combustion pressure and its limitation to a comparatively low value produces furthermore a greater adaptability of operation of the engine.

It should also be remarked that with such an arrangement it is possible to resort to a great variety of liquid fuels by modifying the shape of the chamber, the grade of its thermal insulation and the location and direction of the injector.

FIGS. 2 and 3 show with further detail a transfer port 25 for an oval combustion chamber 26 similar to that illustrated in FIG. 1. FIG. 3 shows the shape of the transverse cross-section of the port which is constituted by a curvilinear triangle wherein the base 27 has the same radius of curvature R as the semi-spherical upper cap 28 of the chamber 26. Further, the corresponding wall forms part of a geometric cylinder circumscribable about the sphere defining the upper cap and the medial generating line of which is shown at 29.

Said arrangement prevents the air serving for combustion from impinging on the major section of the toroidal wall 30 of the chamber, while the air is being transferred towards the inside of the chamber and, on the other hand, during the transfer stage of the burning gases towards the cylinder; this ensures a certain amount of concentration of the gasiform stream corresponding to the end of the combustion.

Obviously, the present invention is not limited to the embodiment described and illustrated by way of examples and many modifications may be brought thereto within the scope of the accompanying claims.

What is claimed is:

1. In an internal combustion engine of the cylinder and piston type, the combination comprising a combustion chamber associated with each cylinder, said combustion chamber formed by an upper cap having an internally spherical surface and provided with an opening for fuel injection, a lower cap having an internally spherical surface and provided with a transfer orifice and having a radius of curvature smaller than that of said upper spherical cap and an internally toroidal surface interconnecting said caps, a transfer channel communicating between said cylinder and said combustion chamber through the orifice in said lower cap, said channel being formed at least adjacent said orifice by a plurality of smoothly merging internal wall portions, one of said wall portions being of cylindrical configuration and coinciding with a geometrical cylinder circumscribable about the internal spherical surface of said upper cap, the cross-section of said channel at said wall portions having a center of gravity located substantially closer to said cylindrical wall portion than to any other of said wall portions.

2. The combination as defined in claim 1, wherein the cross-sectional area of said transfer channel progressively increases toward said cylinder.

No references cited.

MARK NEWMAN, *Primary Examiner.*

L. M. GOODRIDGE, *Assistant Examiner.*